Patented Apr. 29, 1941

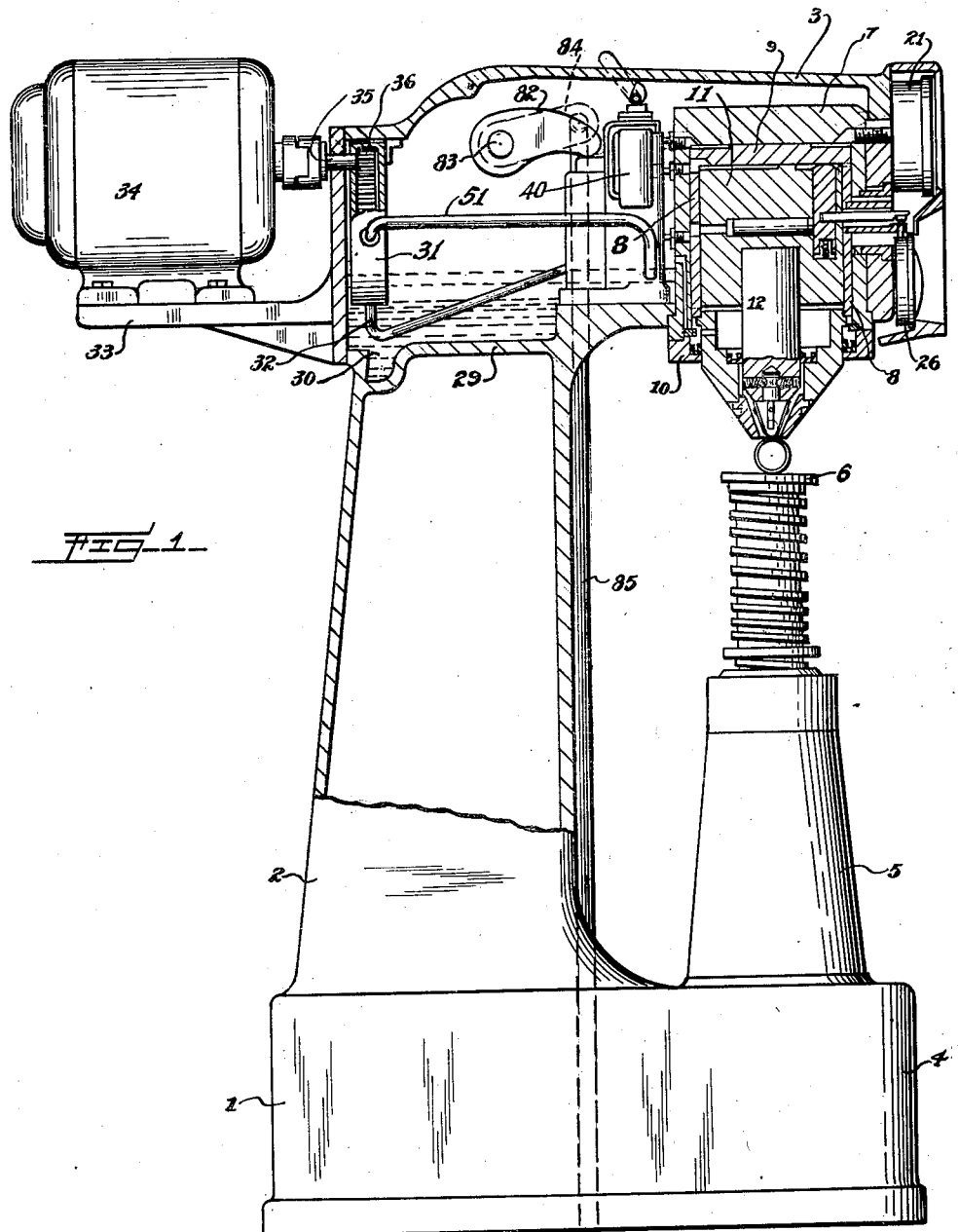

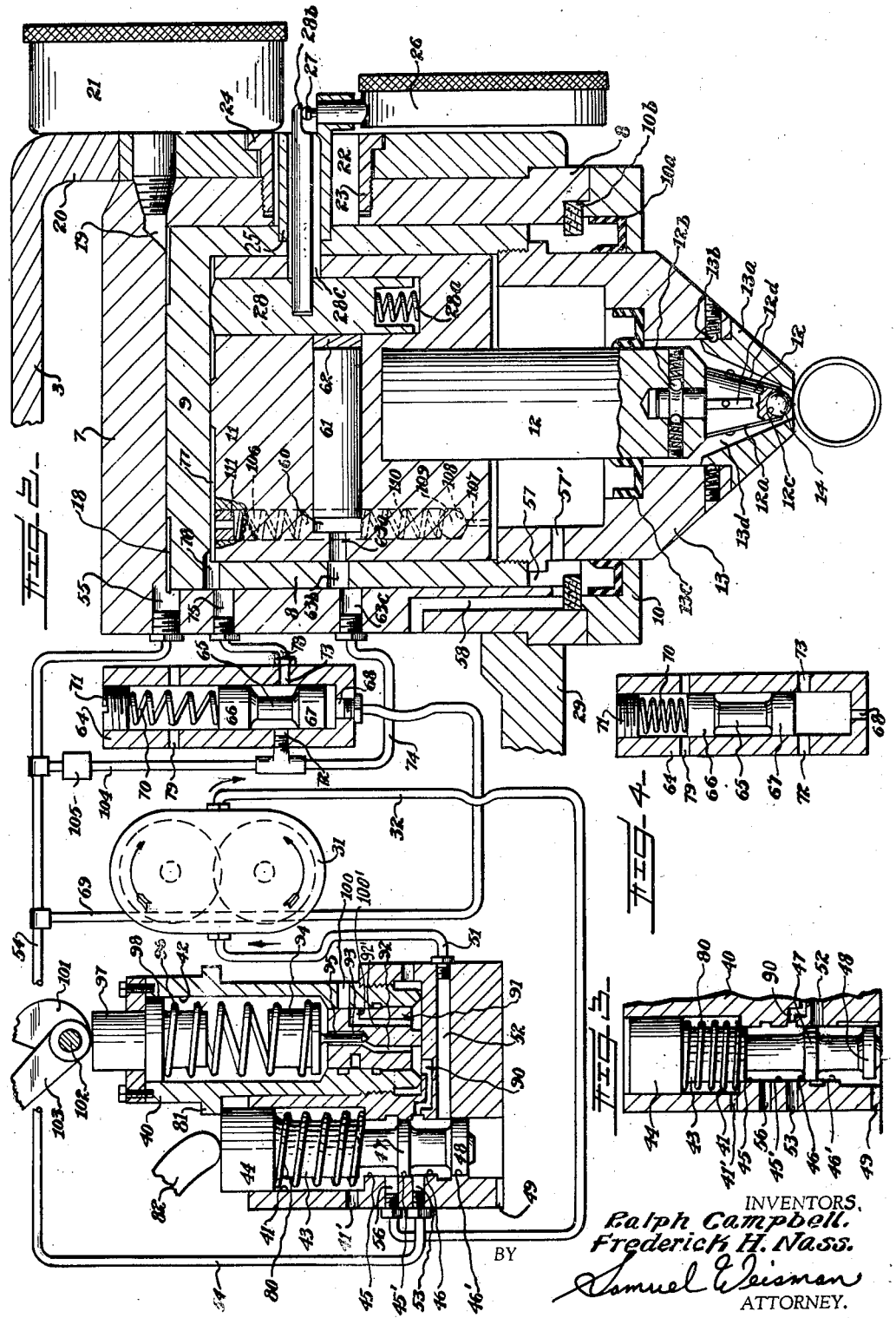

2,240,154

UNITED STATES PATENT OFFICE 2,240,154

MACHINE FOR TESTING HARDNESS OF DISTORTABLE BODIES

Ralph Campbell and Frederick H. Nass, Detroit, Mich., assignors to Detroit Testing Machine Company, Detroit, Mich., a corporation of Michigan Application June 11, 1938, Serial No. 213,114

14 Claims. (Cl. 265—14)

The present invention pertains to a novel machine for testing the hardness of materials, particularly metals, operating on the general principle disclosed in the United States Patent issued to Nass and Campbell No. 2,099,216 of November 17, 1937, and in our co-pending application Serial No. 208,794 filed May 19, 1938 which has matured into Patent No. 2,203,129.

The machine of this invention, as well as those of the patent and application identified above, operates on the Brinell principle of causing a hard test ball to penetrate into the sample or specimen. One of the objects of the invention is to avoid the use of a spring exerting pressure on the test ball, since the pressure of the spring becomes a component of the testing pressures, and any variation or variability in the spring is reflected as an inaccuracy in the test. Such a spring is used in prior art machines to return the test ball to starting position after the test has been completed. According to the present invention, no such spring is used, and the test ball is returned by the suction of the same pump that applies fluid pressure on the test ball during the test. The invention also comprises a valve system for selectively applying either the pressure or the suction of the pump to the test ball.

Another object of the invention is to provide a machine of the character described suitable for the accurate testing of members capable of substantial distortion. The machine is designed to distort the member to its limit before a reading is shown on the indicator. Also, after the distortion, a pre-load pressure is applied to the specimen, without affecting the indicator, as in our co-pending application identified above. When the pre-determined pre-load pressure has been reached, the testing pressure is applied, and the indicating instrument goes into operation at substantially the same time. Thus, the machine of the present invention applies three different pressures for distortion, pre-load and test. Only one movement of the initial operating member is necessary, and thereafter the three pressures are applied consecutively and automatically by mechanism characteristic of the invention and described in detail hereinafter.

The invention is fully disclosed by way of example in the following description and in the accompanying drawings, in which Figure 1 is a vertical section, partly in elevation, of the complete machine and showing the general assembly thereof;

Figure 2 is a diagrammatic view showing parts of the machine in section and hydraulically connected together;

Figure 3 is a detail section of the control valve in a different position, and

Figure 4 is a detail section of the pre-load valve in a different position.

Reference to these views will now be made by use of like characters that are employed to designate corresponding parts throughout.

In Figure 1 the frame of the machine is shown as comprising a base 1, a standard 2 and a head 3. The base projects beyond the standard at one side, as indicated by the numeral 4, and in this portion is mounted a screw post 5 carrying a work-supporting anvil 6 adjustable vertically to and from the head 3. Similarly, the head 3 is extended laterally over the portion 4, thereby forming a frame of the G or gap type.

Within the head 3 is formed or mounted a fixed cylinder 7 on a vertical axis preferably common to the axis of the screw post 5. In the cylinder is slidably mounted a hollow piston or piston-cylinder 8 having a solid top 9. A base ring 10 is suitably attached to the lower end of the cylinder 7. Within the member 8, in turn, is mounted a solid piston 11 carrying a spindle 12 projecting into a conical fitting 13 secured to the lower end of the member 8. The lower end of the spindle 12 carries a collet 12a held by spring backed balls 12b. In the lower end of the member 12a is formed a spherical socket 12c in which is inserted a testing tool 14 held by flat springs 12d. In the lower end of the member 13 is inserted a removable nose piece 13a held by spring backed balls 13b. The nose piece 13a has an opening 13d therethrough accommodating the members 12a and 14 and permitting a slight movement of the member 14 beyond the lower end of the nose, for a purpose that will presently appear.

A cup washer 10a is mounted in the member 10 to engage the fitting 13, and an annular gasket 10b is provided between the member 10 and the lower end of the cylinder 7. Another cup washer 13c is mounted in the member 13 to engage the spindle 12. Thus, the interior of the members 7, 8 and 13 is shielded against dust from the outside. The spring backed balls 12b and 13b permit easy removal of the collet 12a and nose 13a for access to or replacement of the collet and the test ball 14.

A peripheral recess 18 is cut out in the top of the piston-cylinder 8. In communication with this recess, a hole 19 is formed through the end wall 20 of the head 3 and through the adjacent wall of the cylinder 7, and this hole is brought into communication with a pressure gauge 21 mounted on the wall 20.

Another opening 22 is formed through the wall 20 and the adjacent wall of the cylinder 7. A nut 23 is mounted in the opening, being threaded in the wall of the cylinder 7 and having at its outer end a flange 24 that serves as additional clamping means for the two walls. The member 8 carries a tube 25 projecting through the opening 22, and to the outer end of the tube is secured a depth gauge 26 having its operating stem 27 uppermost.

A plug 28 is mounted vertically in the piston 11 and rests on a coil spring 28a that tends to hold the plug against the top 9 of the piston 8. A finger 28b is carried by and extends laterally from the plug 28, through an appropriate opening 28c in the members 8 and 11 and through the tube 25. The outer end of the finger 28b is adapted to engage and actuate the stem 27 of the indicator 26.

When the pistons 8 and 11 move together, there is obviously no deviation from the initial or zero reading on the indicator 26. An actual reading is shown, however, when the piston 11 moves downward in relation to piston 8, carrying with it the plug 28 which is locked thereto by a means presently to be described.

In the top of the standard 2 (Figure 1) is formed a floor 29 at approximately the level of the cylinder base 13, whereby the head 3 is adapted to serve as a reservoir for containing a quantity of oil 30 or other suitable pressure fluid. A gear pump 31 is mounted in the head with its outlet pipe 32 extending to another part of the apparatus, as will presently appear. Adjacent thereto, on the head, is an outside shelf 33 carrying a motor 34 which drives the pump through a shaft 35 and pinion 36.

At a suitable position in the reservoir and preferably close to the cylinder 7 is mounted a valve body 40 with two cylinders 41 and 42 formed therein. In the cylinder 41 is mounted a piston valve 43 having at its upper end a head 44 closing the upper end of the cylinder. The cylinder has four seats or restrictions 45, 45', 46 and 46' at which the cylinder may be obstructed by heads 47 and 48 respectively formed on the piston valve. The lower end of the cylinder 41 opens directly into the reservoir, through a port 49. The valve stops against the bottom of the reservoir.

The inlet of the pump 31 is connected by piping 51 to a port 52 terminating immediately above the seat 46' in the cylinder 41. Above the seat 46 is a port 53 connected by a line 54 to a port 55 formed in the cylinder 7 and communicating with the recess 18 in the member 8 when the latter is in its uppermost position against the top of cylinder 7, as illustrated in Figure 2. Above the seat 45 is a drain hole 41' placing the adjacent portion of the cylinder 41 in communication with the reservoir. Between the seats 45 and 45' is a port 56 connected by the line 32 to the outlet side of the pump 31.

When the piston 8 is raised as in Figure 2, it leaves a space 57 in the bottom of the cylinder 7. This space communicates through a port 57' with the interior chamber of member 13 below the piston 11. A vent 58 is formed through the wall of the cylinder 7 connecting the space 57 and port 57' with the atmosphere above the oil level in the reservoir.

In the piston 11 is formed a horizontal cylindrical recess 60 containing a locking piston 61 with a friction washer 62 at its inner end adapted to engage the plug 28. Registering ports 63a, 63b and 63c are formed respectively in the piston 11 and cylinders 8 and 7 to connect with the recess 60. When the piston 61 is forced against the plug 28, by means presently to be described, the plug is locked against movement relatively to piston 11 and moves with piston 11.

Suitably positioned within the reservoir is another valve cylinder 64 containing a piston valve 65 with heads 66 and 67 at its ends. In the bottom of the cylinder is a port 68 into which the line 54 is branched at 69. The valve is held downward by a spring 70 adjustable by a screw 71 in the top of the cylinder.

The cylinder is formed with a pair of ports 72 and 73, the latter slightly below the former, and both above the head 67 when the valve is in the lower position, illustrated in Figure 2. The port 72 is connected by a line 74 to the port 63c.

Below the port 55, the wall of cylinder 7 has a port 75 communicating at all times with another port 76 through the wall of, and communicating with the interior, of piston 8. The top of the piston 11 is also formed with a peripheral recess 77 communicating with the port 76 even when the piston 11 engages upwardly against the top of member 8, as in Figure 2. The port 73 of valve cylinder 64 is connected by a line 78 to port 75. Additional ports 79 are formed through the wall of cylinder 64 for drainage and venting.

In the operation of the device as thus far described, a compressed spring 80 in cylinder 41 between the seat 45 and head 44 holds the piston valve 43 in its upper position against a stop collar 81 on the valve body 40, as shown in Figure 2. The top of the valve 43 is engaged by a lever 82 on a shaft 83 (Figure 1) from which extends an arm 84. A connecting rod 85 is dropped from the arm to a suitable pedal 86 at the base of the machine, by means of which the valve 43 may be depressed to the floor 29. In the depressed position, the valve head 47 engages the seat 46, thereby blocking the passage 52 from the ports 53 and 56 and establishing communication between the two last named ports, while port 52 is in communication with port 49. Pressure is thus transmitted from the pump through line 32 and ports 56 and 53 to line 54 and port 55, whereupon both pistons 8 and 11 move downward together. The suction side of the pump draws fluid through line 51, passage 52, the lower portion of cylinder 41, and port 49.

The specimen being tested is in the form of a tubular member or other structure capable of substantial distortion. The pressure of the nose 13a and test ball 14 on the specimen distorts the latter almost to its limit without collapsing. This pressure is regulated by adjustment of the spring 70 which, when overcome, produces another action.

When the pressure in line 54 and branch 69 overcomes the spring 70, the valve 65 rises and first uncovers port 73 which delivers pressure fluid through line 78 to ports 75 and 76 to the top of piston 11. At this time, the piston 8 is partially balanced by pressure on both sides of its top 9 and held against further downward movement by the engagement of the nose 13a with the specimen. The piston 11, however, is forced downward, causing the ball 14 to penetrate the specimen to some extent. This relative movement of the pistons is not indicated on the gauge 26 since the plug 28 is relatively slidable in the piston 11 and is held against the top of the piston 9 by the spring 28a.

The pressure applied by the penetrator 14 on the specimen during this particular operation is known as the pre-load. The purpose of this penetration is to break through any scale or other foreign matter on the surface of the specimen and to take up any slack that may exist in the apparatus, thereby bringing the penetrator 14 into contact with sub-surface metal.

The pre-load operation is terminated and the actual test load pressure applied when the fluid pressure increases sufficiently to force the valve head 67 to a position uncovering at least a part of the port 72. Thus, it will be seen that the pre-load pressure is also determined by the spring 70.

On opening of the port 72, pressure is transmitted through line 74 and ports 63c, 63b and 63a to piston 61, whereby the plug 28 is locked to piston 11. The application of pressure upon piston 11 continues, and the movement of the piston continues, carrying with it the locked plug 28 and finger 28b and forcing the penetrator 14 still farther into the specimen. The extent of the penetration occurring after the locking of plug 28 is measured by the action of the finger 28b on the now stationary gauge 26. The test consists in finding the depth of penetration for a given test or load pressure on piston 11. The means for predetermining the latter pressure will now be described.

The valve body 40 has a port 90 above port 52 and connecting the cylinder 41 to the cylinder 42. The port 90 is normally covered by a valve 91 normally resting on the bottom of cylinder 42. The valve has a through aperture 92 enlarged at its upper end as at 93. Over the valve is a spring retainer 94 having a stem 95 seated in the enlargement and of greater length than the enlargement. Thus, the upper end of the valve, which is slightly smaller than the lower end, remains exposed to the pressure fluid that flows through the aperture 92. A spring 96 is mounted on the retainer 94, and on the spring is a head 97 held by a collar 98 mounted upon the cylinder 42.

The cylinder 42 has an overflow port 100 draining into the reservoir.

The valve 91 also has another axial passage 92' terminating in a peripheral groove 100' adapted to register with port 100.

When the pump pressure exceeds that of the spring 96, the valve 91 is lifted, and the pressure fluid is relieved through the port 90 and through passage 92', groove 100' and port 100, when the valve 91 is raised, as will presently be described without exerting additional operating pressure on either of the pistons 8 and 11. Thus, the spring 96 determines the maximum fluid pressure applied on the piston 11 and penetrator 14.

This pressure, which is the load pressure, is regulated by a cam 101 on a shaft 102 over the head 97. The shaft carries an arm 103 by which the adjustment is made and which can be locked in the desired position by any suitable means for the purpose. Owing to the slight difference between the areas of the lower and upper ends of the valve 91, a comparatively small adjustment of the head effects a substantial difference in the fluid pressure required to open the valve.

The reading of the gauge 26 is taken. This is the maximum penetration of member 14 under the pressure permitted by spring 96. The pressure on pedal 86 is now released, permitting the valve 43 to return to the position shown in Figure 2, which is the idling position. Since the port 56 is now in communication with the exhaust port 41' and the reservoir, the pressure fluid from the pump is merely discharged into the reservoir. With the pressure thus relieved, the valve 91 also returns to the position shown in Figure 2, blocking port 90. Likewise, the pump pressure is relieved throughout the system, whereupon the valve 65 returns to the downward position and the pressure is taken off the locking piston 61.

The intake side of the pump is now in free communication with the port 55 through line 51, passage 52, port 53 and line 54. The vacuum thus created above the piston 9 returns the latter to the position shown in Figure 2.

A branch line 104 connects the line 54 to the port 72. In this branch is inserted a check valve 105 which closes when there is pressure in the system and opens under sub-atmospheric pressure in the line 54. Thus, when the piston 9 has been lifted sufficiently to bring the ports 76 and 75 into register with each other, the suction of the pump draws from the top of piston 11 through branch 104, ports 72 and 73, line 78 and ports 75 and 76, first removing the fluid and then lifting the piston 11 to the position shown in Figure 2.

While the pistons are under suction, their bottoms are exposed to atmospheric or reservoir pressure through port 57', space 57 and passage 58. When the pistons are under fluid pressure, air or fluid is displaced from beneath them through the same channel.

If the pump continues to operate after both pistons have reached their upper position, the suction on piston 11 is relieved through the piston. For this purpose, a passage 106 extends from the top of the piston to a smaller passage 107 extending through the bottom and forming a valve seat 108. On the seat is a ball valve 109 backed by a spring 110, the upper end of which is held by an adjustable apertured screw 111. After a given degree of vacuum has been established on the piston 9, the ball valve 109 is raised from its seat to bring the intake side of the pump into communication with the reservoir through the passages 106 and 107, port 57', space 57 and passage 58.

Although a specific embodiment of the invention has been illustrated and described, it will be understood that various alterations in the details of construction may be made without departing from the scope of the invention as indicated by the appended claims.

What we claim is:

1. In a testing machine, two relatively movable members, a work-engaging piece carried by one of said members, a penetrator carried by the other member, said members being movable in the same direction towards the work, a common means for actuating said members simultaneously, means for actuating said other member alone at a predetermined pressure on the first member, a gauge-actuating member loosely mounted on said other member and adapted to remain inactive during preliminary movement of said other member, and means operable at pre-determined pressure on said other member for locking said actuating member thereto, whereby said actuating member becomes operative throughout further movement of said other member.

2. In a testing machine, two relatively, movable members, a work-engaging piece carried by one of said members, a penetrator carried by the other member, a pressure system for actuating said members simultaneously, means for actuating said other member alone at a pre-determined pressure in said system, a gauge-actuating member loosely mounted on said other member and adapted to remain inactive during preliminary movement of said other member, and means operable at pre-determined pressure on said other member for locking said actuating member thereto, whereby said actuating member becomes operative throughout further movement of said other member.

3. In a testing machine, a cylinder, two pistons in said cylinder, one being within the other, a work-engaging piece carried by one end of the outer piston, a penetrator carried by the inner piston, pressure means for moving said pistons, first simultaneously and then the inner piston alone at a pre-determined pressure, and means for measuring the relative movement of said pistons.

4. In a testing machine, a cylinder, two pistons in said cylinder, one being within the other, a work-engaging piece carried by one end of the outer piston, a penetrator carried by the inner piston, pressure means for moving said pistons, first simultaneously and then the inner piston alone at a pre-determined pressure, and means for measuring the relative movement of said pistons, at a higher pre-determined pressure.

5. In a testing machine, a cylinder, two pistons in said cylinder, one being within the other, a work-engaging piece carried by one end of the outer piston, a penetrator carried by the inner piston, pressure means for moving said pistons, first simultaneously and then the inner piston alone at a pre-determined pressure, means for measuring the relative movement of said pistons, normally inoperative means for actuating for said measuring means, and means for rendering said actuating means operative upon the occurrence of a pressure higher than said pre-determined pressure.

6. In a testing machine, a cylinder, two pistons in said cylinder, one being within the other, a work-engaging piece carried by one end of the outer piston, a penetrator carried by the inner piston, a pressure system leading to the opposite end of the outer piston, whereby to move both pistons together, means operable at a pre-determined pressure in said system for introducing pressure between said pistons to move the inner piston alone, and means for measuring the relative movement of said pistons.

7. In a testing machine, a cylinder, two pistons in said cylinder, one being within the other, a work-engaging piece carried by one end of the outer piston, a penetrator carried by the inner piston, a pressure system leading to the opposite end of the outer piston, whereby to move both pistons together, means operable at a pre-determined pressure in said system for introducing pressure between said pistons to move the inner piston alone, means for measuring the relative movement of said pistons, normally inoperative means for actuating for said measuring means, and means for rendering said actuating means operative upon the occurrence of a pressure higher than said pre-determined pressure.

8. In a testing machine, a cylinder, two pistons in said cylinder, one being within the other, a work-engaging piece carried by one end of the outer piston, a penetrator carried by the inner piston, a pressure system leading to the opposite end of the outer piston, whereby to move both pistons together, means operable at a pre-determined pressure in said system for introducing pressure between said pistons to move the inner piston alone, an indicator carried by the outer piston, a member carried loosely by the inner piston and adapted to actuate said indicator, and means for locking said member to the inner piston, whereby to measure the relative movement of said pistons.

9. In a testing machine, a cylinder, two pistons in said cylinder, one being within the other, a work-engaging piece carried by one end of the outer piston, a penetrator carried by the inner piston, a pressure system leading to the opposite end of the outer piston, whereby to move both pistons together, means operable at a pre-determined pressure in said system for introducing pressure between said pistons to move the inner piston alone, an indicator carried by the outer piston, a member carried loosely by the inner piston and adapted to actuate said indicator, and means operable at a higher pre-determined pressure for locking said member to the inner piston, whereby to measure the relative movement of said pistons.

10. In a testing machine, a cylinder, a piston in said cylinder, a penetrator carried by said piston, a pressure line leading to one end of said cylinder to actuate said piston and penetrator in the testing direction, a pump, a valve body connected to the inlet and outlet of said pump and to said line, and a valve in said body adapted to connect either said inlet or said outlet to said line, whereby to retract said piston by the suction of said pump when said valve body connects the pump inlet to said line.

11. In a testing machine, a cylinder, a piston in said cylinder, a penetrator carried by said piston, a pump having a connection to one end of said cylinder, and means for selectively connecting the inlet or outlet of said pump to said connection, whereby to actuate said piston and penetrator in the testing direction under pressure and to retract them by the suction of the pump, the other end of said cylinder being vented.

12. In a testing machine, a cylinder, a piston in said cylinder, a penetrator carried by said piston, a pump having a connection to one end of said cylinder, and means for selectively connecting the inlet or outlet of said pump to said connection, whereby to actuate said piston and penetrator in the testing direction under pressure and to retract them by the suction of the pump, the other end of said cylinder being vented, said piston having a passage therethrough from end to end, and a check valve in said passage and adapted to open under suction.

13. In a testing machine, a cylinder, two pistons in said cylinder, one being within the other, a penetrator carried by the inner piston, a pressure system including a pump and connections for moving said pistons first simultaneously and then the inner piston alone at a pre-determined pressure, and means for measuring the relative movement of said pistons, and means for selectively connecting the inlet or outlet of said pump to said connections, whereby to actuate said pistons and penetrator in the testing direction under pressure and to retract them by the suction of the pump, the other end of said cylinder being vented.

14. In a testing machine, a cylinder, two pistons in said cylinder, one being within the other, a penetrator carried by the inner piston, a pressure system including a pump and connections for moving said pistons first simultaneously and then the inner piston alone at a pre-determined pressure, and means for measuring the relative movement of said pistons, and means for selectively connecting the inlet or outlet of said pump to said connections, whereby to actuate said pistons and penetrator in the testing direction under pressure and to retract them by the suction of the pump, the other end of said cylinder being vented, the inner piston having a passage therethrough from end to end, and a check valve in said passage and adapted to open under suction.

RALPH CAMPBELL.
FREDERICK H. NASS.